(12) United States Patent
Chatterjee

(10) Patent No.: US 10,534,468 B2
(45) Date of Patent: Jan. 14, 2020

(54) FORCE SENSING USING TOUCH SENSORS

(71) Applicant: Apple Inc., Cupertino, CA (US)

(72) Inventor: Anirban Chatterjee, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/686,087

(22) Filed: Aug. 24, 2017

(65) Prior Publication Data
US 2019/0064983 A1 Feb. 28, 2019

(51) Int. Cl.
G06F 3/041 (2006.01)
G06F 3/044 (2006.01)
G02F 1/1333 (2006.01)
G02F 1/1343 (2006.01)

(52) U.S. Cl.
CPC .......... G06F 3/0414 (2013.01); G02F 1/1343 (2013.01); G02F 1/13338 (2013.01); G06F 3/044 (2013.01); G06F 2203/04112 (2013.01)

(58) Field of Classification Search
CPC ...... G06F 3/0416; G06F 3/044; G06F 3/0414; G06F 3/0412; G06F 2203/04104; G06F 2203/04106; G06F 2203/04108; G06F 2203/04112; G02F 1/13338; G02F 1/1343
See application file for complete search history.

(56) References Cited

U.S. PATENT DOCUMENTS

| 8,266,971 | B1* | 9/2012 | Jones ................... G01L 1/146 73/862.046 |
| 8,331,603 | B2 | 12/2012 | Martenson et al. |
| 8,885,851 | B2 | 11/2014 | Westenbroek |
| 9,118,990 | B2 | 8/2015 | Hankey et al. |
| 9,128,558 | B2 | 9/2015 | Cok et al. |
| 9,182,859 | B2 | 11/2015 | Coulson et al. |
| 9,223,445 | B2 | 12/2015 | Sleeman et al. |
| 9,644,104 | B2 | 5/2017 | Rothkopf et al. |
| 10,291,975 | B2 | 5/2019 | Howell et al. |
| 2008/0260176 | A1 | 10/2008 | Hollemans et al. |
| 2011/0206215 | A1 | 8/2011 | Bunk |
| 2012/0139864 | A1* | 6/2012 | Sleeman ................. G06F 3/044 345/174 |
| 2013/0009905 | A1* | 1/2013 | Castillo ................... G06F 3/044 345/174 |

(Continued)

FOREIGN PATENT DOCUMENTS

| WO | WO 06/075275 | 7/2006 |
| WO | WO 07/049254 | 5/2007 |

Primary Examiner — Md Saiful A Siddiqui
(74) Attorney, Agent, or Firm — Brownstein Hyatt Farber Schreck, LLP

(57) ABSTRACT

An electronic device includes a surface such as a cover glass, a first group of electrodes coupled to the surface and arranged in a first direction with respect to the surface, a second group of electrodes coupled to the surface and arranged in a second direction with respect to the surface, a dielectric separating the first and second groups of electrodes, and a controller electrically connected to the first and second groups of electrodes. The controller is operable to detect a touch of an object to the surface using a mutual capacitance between the first and second groups of electrodes and determine a non-binary amount of force exerted based on resistances of the first and second groups of electrodes.

20 Claims, 7 Drawing Sheets

(56) References Cited

U.S. PATENT DOCUMENTS

| | | | | |
|---|---|---|---|---|
| 2013/0082973 | A1* | 4/2013 | Wurzel | G06F 3/044 345/174 |
| 2014/0354584 | A1* | 12/2014 | Cok | G06F 3/0414 345/174 |
| 2015/0002452 | A1* | 1/2015 | Klinghult | G06F 3/0416 345/174 |
| 2017/0228066 | A1* | 8/2017 | Chiang | G06F 3/044 |
| 2017/0357344 | A1* | 12/2017 | Hong | G06F 3/0414 |
| 2018/0088629 | A1* | 3/2018 | Kim | G06F 1/1616 |
| 2018/0166507 | A1* | 6/2018 | Hwang | H01L 27/323 |

* cited by examiner

FORCE SENSING USING TOUCH SENSORS

FIELD

The described embodiments relate generally to force and touch sensors. More particularly, the present embodiments relate to determining amounts of force exerted based on resistance changes in electrodes of a capacitive touch sensor.

BACKGROUND

Electronic devices may receive input from users via a number of different kinds of input devices. Examples of input devices include keyboards, computer mice, microphones, touch sensors, touch screens, buttons, switches, knobs, force sensors, track pads, track balls, and so on. In some cases, input devices may be capable of providing feedback and/or other output to users in addition to receiving input.

As electronic devices become smaller and more portable, choices of input devices to use may become increasingly limited. Larger input devices such as keyboards or computer mice may not be particularly feasible for smaller electronic devices such as smart phones. Increasing use may be made of input devices that remain feasible, such as touch screens and/or other touch sensors, force sensors, and so on.

SUMMARY

The present disclosure relates to determining amounts of force exerted based on resistance changes in electrodes of a capacitive touch sensor. A touch sensor may include transversely positioned rows and columns of electrodes separated by a dielectric. Touch of an object may alter mutual capacitances between the electrodes and the touch may be detected based on changes in capacitance. The force exerted by the touch may deform the electrodes and alter their resistance. The touch sensor may determine the non-binary amount of the force based on changes in resistance. In this way, a sensor may determine both touch and force using the same components, allowing for more compact and less expensive sensor and/or electronic device designs.

In various embodiments, a force and touch sensing display assembly includes a cover glass, a display, a set of row electrodes coupled to the cover glass and arranged in a first orientation with respect to the cover glass, a set of column electrodes coupled to the display and arranged in a second orientation with respect to the cover glass, a dielectric separating the set of row electrodes and the set of column electrodes, and a controller electrically connected to the set of row electrodes and the set of column electrodes. The controller is operable to detect a touch of an object to the cover glass using a mutual capacitance between the set of row electrodes and the set of column electrodes and determine a force of the touch using resistances of the set of row electrodes and the set of column electrodes.

In some examples, the set of row electrodes and the set of column electrodes are formed of at least one of indium tin oxide or copper nanowires. In various examples, the dielectric is at least one of polyethylene tetra-phthalate or polyimide.

In numerous examples, the resistances of the row electrodes change when the cover glass bends in a first direction. In various examples, the resistances of the column electrodes change when the cover glass bends in a second direction perpendicular to the first direction.

In some examples, the controller time multiplexes voltage levels of the set of row electrodes and the set of column electrodes to detect the touch and determine the amount of the force. In other examples, the controller frequency multiplexes voltage levels of the set of row electrodes and the set of column electrodes to detect the touch and determine the amount of the force. In various examples, the controller is operable to determine forces of multiple simultaneous touches to the cover glass.

In some embodiments, a force and touch sensing device includes a touch surface, an electrode grid formed of a first set of electrodes and a second set of electrodes that are arranged perpendicular to the first set of electrodes and separated from the first set of electrodes by a dielectric, and a controller electrically connected to the electrode grid. The controller is operable to detect a touch of an object to the touch surface using a mutual capacitance of the electrode grid and determine a force of the touch using resistances of the electrode grid.

In various examples, the controller combines resistances of multiple electrodes of the first set of electrodes and multiple electrodes of the second set of electrodes to determine the force. In other examples, based on a location of the detected touch, the controller selects resistances of multiple electrodes of the first set of electrodes and multiple electrodes of the second set of electrodes in order to determine the force.

In numerous examples, the controller determines a location of the touch using the mutual capacitance of the electrode grid and the resistances of the electrode grid. In various examples, based on a location of the detected touch, the controller weights resistances of the first set of electrodes and the second set of electrodes in order to determine the amount of the force. In some examples, the controller determines the amount of the force when the touch is detected. In various examples, the controller detects the touch when the amount of the force is detected.

In numerous embodiments, an electronic device includes a surface, a first group of electrodes coupled to the surface and arranged in a first direction parallel to the surface, a second group of electrodes coupled to the surface and arranged in a second direction parallel to the surface, a dielectric separating the first and second groups of electrodes, and a controller electrically connected to the first and second groups of electrodes. The controller is operable to detect a touch of an object to the surface using a mutual capacitance between the first and second groups of electrodes, determine a deformation of the surface in the first direction using resistances of the first group of electrodes, and determine a deformation of the surface in the second direction using resistances of the second group of electrodes. In some examples, the controller is operable to determine a force of the touch based at least on the deformation of the surface in the first and second directions.

In various examples, the first group of electrodes are unstrained by deformation of the surface in the second direction. In some examples, the second group of electrodes are unstrained by deformation of the surface in the first direction. In numerous examples, the first direction is orthogonal to the second direction. In various examples, the first and second groups of electrodes are configured in a mesh arrangement.

In some examples, the controller is operable to simultaneously scan the resistances of the first and second groups of electrodes. In various implementations, the resistances of at least one of the first and second groups of electrodes increase when the surface bends.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
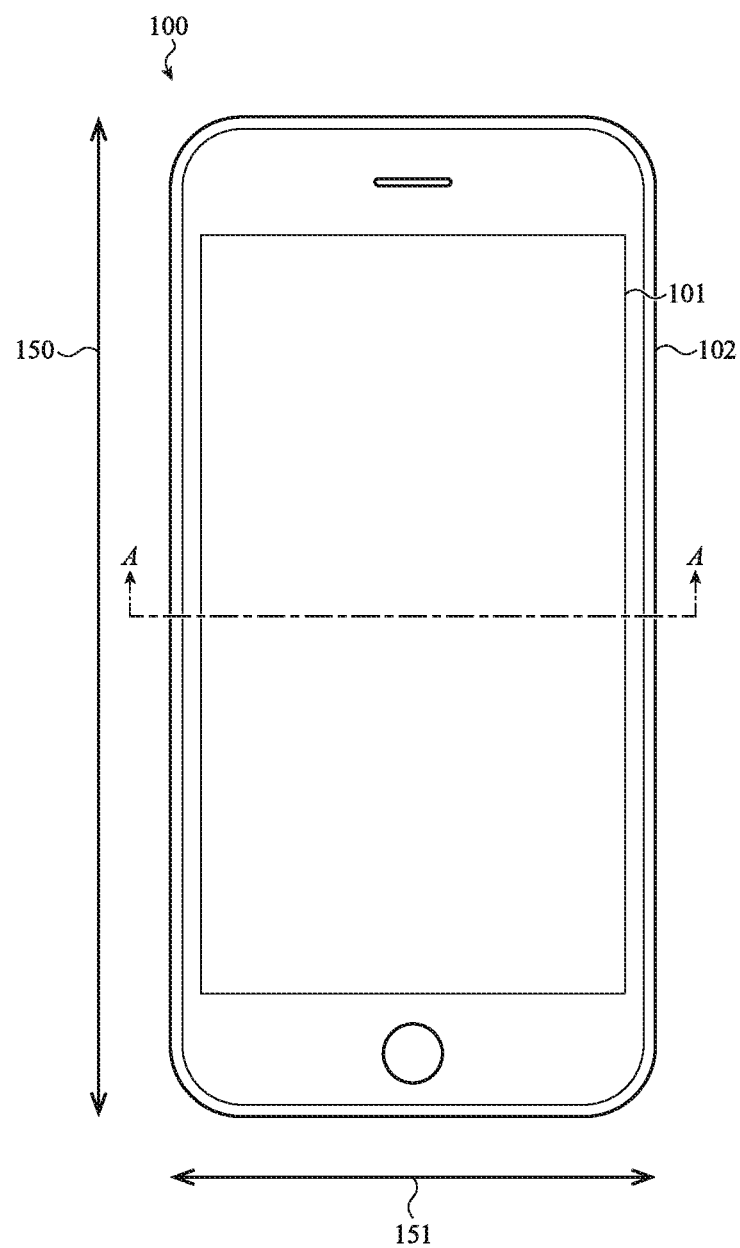
FIG. 1 depicts an electronic device that includes combined force and touch sensors.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

The following disclosure relates to sensing force using touch sensors. A touch sensor may include a grid, mesh, or other configuration that includes rows and columns of electrodes separated by a dielectric. Touch of an object to a surface may alter mutual capacitances between the rows and columns of electrodes. The touch and/or a location of the touch may be detected based on changes in capacitance. The force exerted by the touch may deform the surface as well as the rows and columns of electrodes, altering the resistance of the rows and columns of electrodes. The non-binary amount of the force may therefore be determined based on changes in resistance. In this way, a sensor may determine both touch and force using the same components. This may allow for more compact and less expensive sensor and/or electronic device designs.

In some implementations, the rows and columns of electrodes may be arranged along different directions with respect to the surface, such as along the length and width of the surface. This may allow one of the rows and columns of electrodes to be strained by deformation or bending of the surface along the length of the surface whereas the other is strained by deformation or bending along the width of the surface. By analyzing the resistance changes of both sets or groups of electrodes arranged along the different directions, a more accurate determination of the surface's deformation, and thus the amount of the force exerted upon the surface, may be obtained.

Different techniques may be used in various implementations to prevent interference between touch detection and force amount determination using the rows and columns of electrodes. In some examples, time multiplexing may be used such that mutual capacitance is not being measured at the same time as resistance, such as by time multiplexing voltage levels of the rows and columns of electrodes. In other examples, frequency multiplexing may be used such that touch detection is performed using voltage levels a first frequency or first range of frequencies and force amount determination is performed using voltage levels of a second.

In numerous implementations, the touch sensor may be included in a display assembly. In such implementations, the surface may be a cover glass or similar component and the sensor may be coupled thereto. The sensor may also be coupled to other display assembly components, such as to a display layer. The rows and columns of electrodes may be indium tin oxide or other transparent conductive material, copper nanowires, and so on. The dielectric may be poly-ethylene tetra-phthalate, poly-imide, and so on. In other implementations, the touch sensor may be included in other assemblies, such as in a track pad assembly, a touch pad assembly, and so on.

In some implementations, all of the resistances may be combined to determine the force. In other implementations, resistances of selected electrodes may be used. For example, electrodes may be selected based on which have the highest changed resistance, based on a detected touch location, and so on. Multiple touches and/or multiple force amounts may also be detected and/or determined. For example, multiple touches and/or touch locations may be determined based on areas where changes in mutual capacitance are highest. Similarly, the different force amounts exerted at those locations may be determined based on the changes in resistance of the electrodes corresponding to that area.

In various implementations, force determination may also utilize capacitance changes and/or touch detection may also utilize resistance changes. For example, exerted force may be greatest at the location of a touch and the areas of the highest resistance changes may be used to make touch location determined using changed capacitances more accurate. Similarly, the surface may deform differently based on the location where touch is applied and resistance changes may be weighted based on determined touch location to account for the different ways the surface may deform and improve the accuracy of the determined force amount. Further, in some implementations, the amount of the force may be determined when a touch is detected, touch detection may be performed when an amount of force is detected, and so on.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 depicts an electronic device 100 that includes combined force and touch sensors. The electronic device 100 includes a housing 102 and a force and touch sensing display assembly 101. An exterior of the force and touch sensing display assembly 101 has a length corresponding to a first direction 150 and a width corresponding to the second direction 151.

Figure 2:
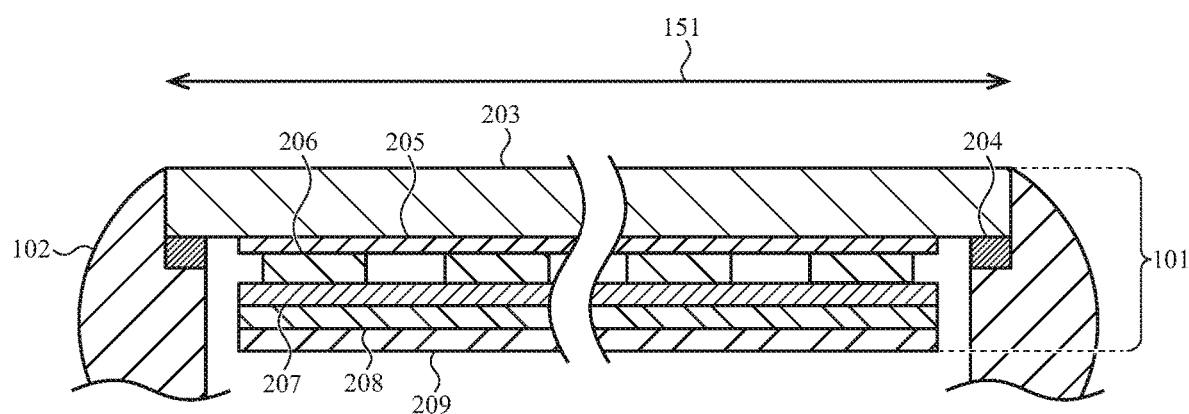
FIG. 2 depicts a cross-sectional view of the electronic device of FIG. 1, taken along line A-A of FIG. 1.

FIG. 2 depicts a cross-sectional view of the electronic device 100 of FIG. 1, taken along line A-A of FIG. 1. The force and touch sensing display assembly 101 includes a cover glass 203 that forms the exterior of the force and touch sensing display assembly 101, optically clear adhesive 205 (which may be transparent and may be optional), a first set or first group of electrodes 206 that are configured as columns (i.e., arranged in a first orientation with respect to and/or parallel to the cover glass 203) in the view shown in FIG. 2 (i.e., column electrodes), a second set or second group of electrodes 208 that are configured as rows (i.e., arranged in a second orientation with respect to and/or parallel to the cover glass 203 that is perpendicular orthogonal to the first orientation or the first group of electrodes 206) in the view shown in FIG. 2 (i.e., rows electrodes), and a dielectric 207 separating the first group of electrodes 206 from the second group of electrodes.

The first group of electrodes 206 may be coupled to the cover glass 203 by the optically clear adhesive 205. The force and touch sensing display assembly 101 may also include a display layer 209 and the second group of electrodes 208 may be coupled to the display layer 209. The cover glass 203 may be coupled to the housing 102 via supports 204. As such, the cover glass 203 and/or the supports 204 may suspend the optically clear adhesive 205, the first group of electrodes 206, the dielectric 207, the second group of electrodes 208, and the display layer 209 from the cover glass 203 above a portion of the housing 102.

Although a particular configuration is illustrated, and described, it is understood that this is an example. For example, the optically clear adhesive 205 may be optional. In some implementations, the first group of electrodes 206 may be deposited directly onto the cover glass 203.

In various implementations, the first group of electrodes 206 and/or the second group of electrodes 208 may be formed of transparent conductive material. Examples of such transparent conductive materials include, but are not limited to indium tin oxide, gallium-doped zinc oxide, nanowire, and so on. In other implementations, the first group of electrodes 206 and/or the second group of electrodes 208 may be used in an assembly that is not transparent. for example, the first group of electrodes 206 and/or the second group of electrodes 208 may be used in a trackpad, in an assembly that positioned the first group of electrodes 206 and/or the second group of electrodes 208 under an ink layer formed on a glass housing such that the first group of electrodes 206 and/or the second group of electrodes 208 are obscured, and so on. In such implementations, the first group of electrodes 206 and/or the second group of electrodes 208 may be formed out of opaque conductive materials such as copper, silver, and so on.

Figure 3:
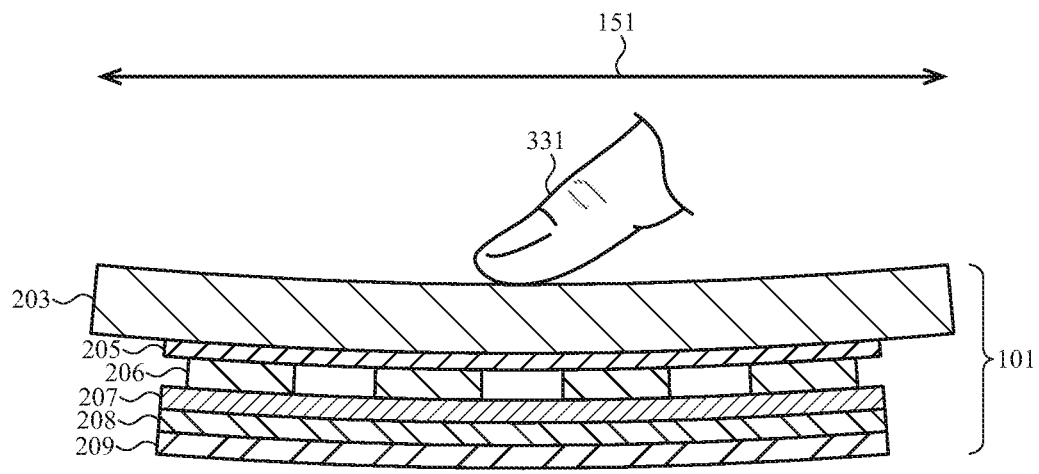
FIG. 3 illustrates the force and touch sensing display assembly of the electronic device of FIG. 2, with other components removed for clarity, when a force is exerted.

FIG. 3 illustrates the force and touch sensing display assembly 101 of the electronic device of FIG. 2, with other components removed for clarity, when a force is exerted by an object 331 touching the cover glass 203. The object 331 exerts an amount of force that deforms the cover glass 203, the optically clear adhesive 205, the dielectric 207, the display layer 209, and the second group of electrodes 208 in the second direction 151. However, deformation of the cover glass 203, the optically clear adhesive 205, the dielectric 207, and the display layer 209 in the second direction 151 may leave the first group of electrodes 206 unstrained or unaffected due to their orientation in the orthogonal first direction 150.

Figure 4:
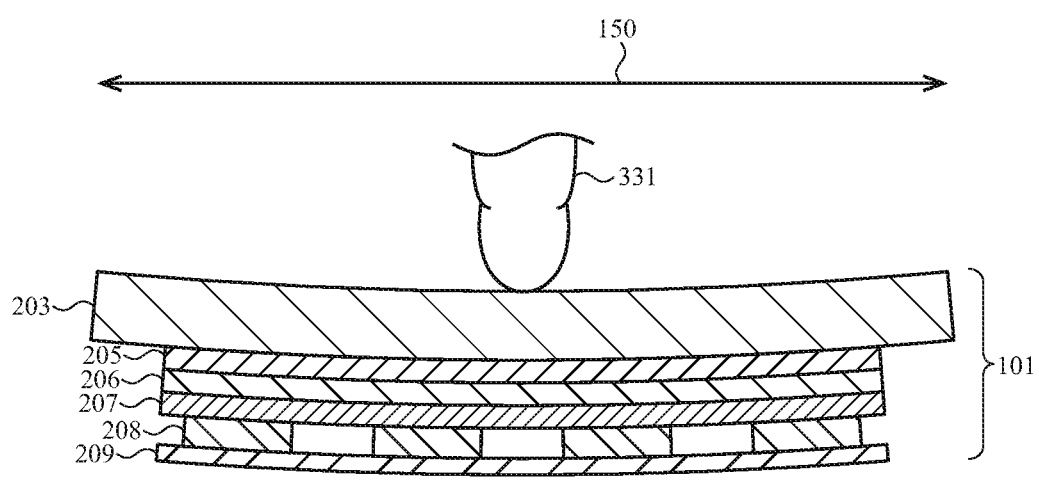
FIG. 4 depicts another view of the force and touch sensing display assembly of the electronic device of FIG. 3.

FIG. 4 depicts another view of the force and touch sensing display assembly 101 of the electronic device of FIG. 3 when the force is exerted by the object 331 touching the cover glass 203. The view of FIG. 4 is orthogonal to the view of FIG. 3, showing the force and touch sensing display assembly 101 in the first direction 150. The amount of the force exerted by the object 331 deforms the cover glass 203, the optically clear adhesive 205, the dielectric 207, the display layer 209, and the second group of electrodes 208 in the first direction 150. However, deformation of the cover glass 203, the optically clear adhesive 205, the dielectric 207, and the display layer 209 in the first direction 150 may leave the second group of electrodes 208 unstrained or unaffected due to their orientation in the orthogonal second direction 151.

Mutual capacitances between pairs of the first and second groups of electrodes 206, and 208 may be monitored. For example, the first group of electrodes 206 may be driven and capacitance may be sensed from the second group of electrodes 208. In other examples, this may be reversed and/or may be dynamically configurable. The touch of the object 331 to the cover glass 203 as shown in FIGS. 3 and 4 may change the mutual capacitances (presuming the object 331 is electrically conductive, such as where the object 331 is a user's body part such as a finger, a conductive tip of a stylus, conductive threads sewn into fabric gloves, and so on). As such, the touch may be detected and/or a location of the touch may be determined by analyzing where capacitances are changed between the first and second groups of electrodes 206, 208.

Similarly, the deformation of the first group of electrodes 206 in the first direction 150 shown in FIG. 4 and the deformation of the second group of electrodes 208 in the second direction 151 shown in FIG. 3 relating to the force exerted by the object 331 may change resistances of the first and second groups of electrodes 206, 208. Increasing the deformation or bending of the first and second groups of electrodes 206, 208 (or the cover glass 203) may increase or decrease the resistance of the first and second groups of electrodes 206, 208. By monitoring changes in the resistances of the first and second groups of electrodes 206, 208, the amount of deformation and/or the amount of force exerted by the object 331 may be determined.

In some implementations, the resistances of all of the first and second groups of electrodes 206, 208 may be determined simultaneously. In other implementations, the resistances of various row and/or column electrodes of the first and second groups of electrodes 206, 208 may be determined at various times.

Figure 5:
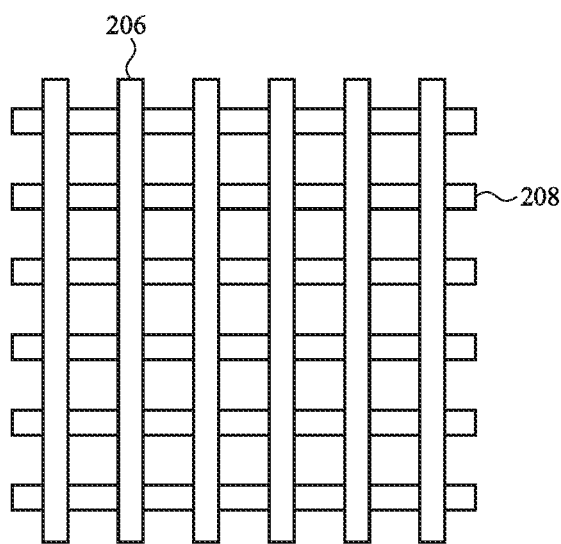
FIG. 5 depicts a top view of the grid or mesh configuration of the first and second groups of electrodes of FIG. 2 with other components removed for clarity.

FIG. 5 depicts a top view of the grid or mesh configuration of the first and second groups of electrodes 206, 208 of FIG. 2 with other components removed for clarity. The view may correspond to that of FIG. 1, showing the electrode grid formed by the orthogonal transverse orientations (first and second orientations corresponding to the first and second directions 150, 151) of the first and second groups of electrodes 206, 208.

As illustrated in FIGS. 1-5, the rows and columns of the first and second groups of electrodes 206, 208 are arranged along different directions (the first and second directions 150, 151) with respect to the cover glass 203, such as along the length and width of the cover glass 203 (as opposed to the thickness shown in FIG. 2 extending between the exterior surface of the cover glass 203 and the interior surface of the cover glass 203 that is coupled to the optically clear adhesive 205). This allows one of the first and second groups of electrodes 206, 208 to be strained by deformation or bending of the cover glass 203 along the length of the cover glass whereas the other is strained by deformation or bending along the width of the cover glass 203. By analyzing the resistance changes of both of the first and second groups of electrodes 206, 208 arranged along the different directions (the first and second directions 150, 151), a more accurate determination of the cover glass's deformation, and thus the amount of the force exerted upon the cover glass, may be obtained.

Various techniques may be used to prevent interference between touch detection and force amount determination using the first and second groups of electrodes 206, 208. In some examples, the electronic device 100 may time multiplex voltage levels of the first and second groups of electrodes 206, 208 so that the electronic device 100 is not measuring or scanning mutual capacitance of pairs of the first and second groups of electrodes 206, 208 at the same time as resistance of the first and second groups of electrodes 206, 208. In other examples, the electronic device may frequency multiplex voltage levels of the first and second groups of electrodes 206, 208 so that the electronic device 100 performs touch detection a first frequency or first range of frequencies (such as 100 kilohertz or 99-101 kilohertz) and force amount determination using a second frequency or second range of frequencies (such as 10 kilohertz or 9-11 kilohertz).

The dielectric 207 and/or the first and second groups of electrodes 206, 208 may be transparent so as to not obscure the display layer 209. The first and second groups of electrodes 206, 208 may be indium tin oxide or other transparent conductive material, copper nanowires, and so on. The dielectric 207 may be polyethylene tetra-phthalate, poly-imide, and so on.

In some examples, the electronic device 100 may combine all of the resistances of the first and second groups of electrodes 206, 208 to determine the force. In other examples, the electronic device 100 may use resistances of selected electrodes of the first and second groups of electrodes 206, 208. In some implementations of such examples, the electronic device 100 may select electrodes of the first and second groups of electrodes 206, 208 based on which have the highest changed resistance, based on a detected touch location, and so on.

The electronic device 100 may detect and/or determine multiple touches and/or multiple force amounts. For example, the electronic device may determine multiple touches and/or touch locations based on areas where changes in mutual capacitance between pairs of the first and second groups of electrodes 206, 208 are highest. Similarly, the electronic device may determine different force amounts exerted at those locations based on the changes in resistance of the first and second groups of electrodes 206, 208 corresponding to that area.

In various implementations, the electronic device 100 may also utilize capacitance changes in determining force amounts and/or also utilize resistance changes in detecting touch. For example, exerted force may be greatest at the location of a touch and the electronic device may use the areas of the highest resistance changes to make touch location determined using changed capacitances more accurate. Similarly, the cover glass 203 may deform differently based on the location where touch is applied and the electronic device 100 may weight resistance changes based on determined touch location to account for the different ways the cover glass 203 may deform and improve the accuracy of the determined force amount. Further, in some implementations, the electronic device 100 may determine the amount of the force when a touch is detected, may perform touch detection when the electronic device 100 detects amount of exerted force, and so on.

Although the force and touch sensing display assembly 101 is described above and illustrated in FIGS. 1-5 as including particular components arranged in a particular configuration, it is understood that this is an example. In various implementations, other force and touch sensing display assemblies or devices may be include the same, similar, and/or different components arranged in a variety of different configurations without departing from the scope of the present disclosure.

For example, the force and touch sensing display assembly 101 is illustrated and described as including a force and touch sensing device (including first and second groups of electrodes 206, 208 separated by a dielectric 207) coupled between a cover glass 203 and a display layer 209. However, in other implementations, the force and touch sensing device may be coupled above a cover glass, below the display layer 209, and so on.

Further, the force and touch sensing device may be coupled to a touch or other surface other than the cover glass 203 and may or may not be associated with a display layer 209. For example, the surface may be the surface of a track pad or touch pad, a housing of an electronic device 100, and so on. Various configurations are possible and contemplated.

Additionally, the electronic device 100 is illustrated as a smart phone. However, it is understood that this is an example. In various implementations, the electronic device 100 may be any kind of device that includes force and touch sensing capabilities. Examples of such devices include, but are not limited to, desktop computing devices, cellular telephones, digital media devices, wearable devices, tablet computing devices, mobile computing devices, kitchen appliances, printers, displays, accessory devices, landline telephones, digital media players, laptop computing devices, automobiles, and so on.

Figure 6:
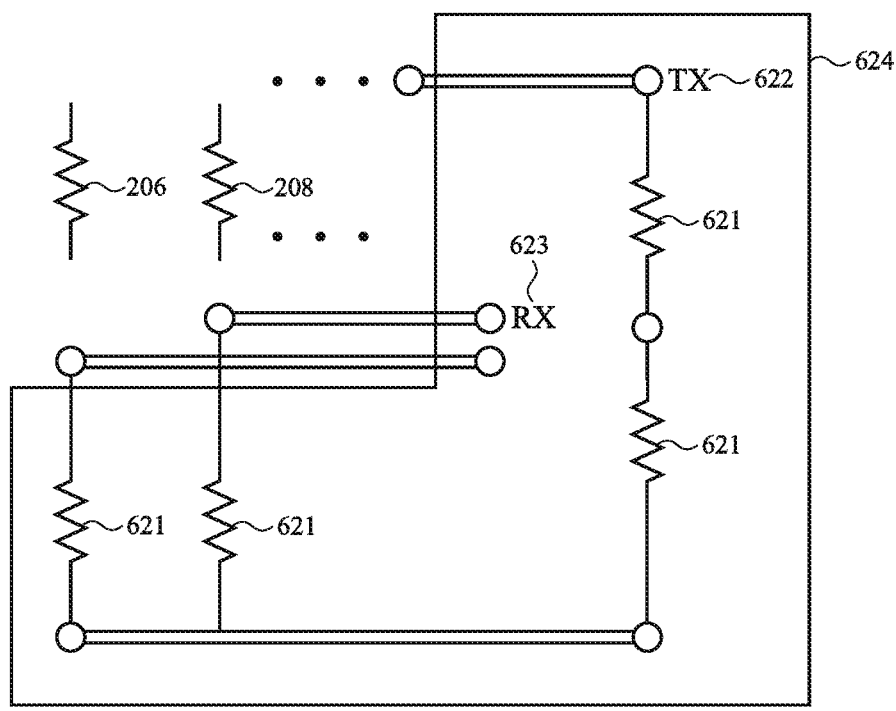
FIG. 6 depicts an example circuit diagram that may be used with the electronic device of FIG. 2 to detect touch and determine amounts of force exerted.

FIG. 6 depicts an example circuit diagram that may be used with the electronic device 100 of FIG. 2 to detect touch and determine amounts of force exerted. This example circuit may be arranged in a quarter bridge configuration.

Drive lines TX 622 and sense lines RX 623 of a readout circuit 624 may be respectively electrically connected to opposing ends of the first and second groups of electrodes 206, 208. The readout circuit 624 may include reference resistors 621 electrically connected to the drive lines TX 622 and the sense lines RX 623 to form a Wheatstone bridge. In this configuration, the first and second groups of electrodes 206, 208 may form a quarter of the Wheatstone bridge and the reference resistors 621 may form the remainder of the Wheatstone bridge. There is a set ration between the resistances of resistors of a Wheatstone bridge. Because of this ratio and because the resistances of the reference resistors 621 are known, the resistances of the first and second groups of electrodes 206, 208 may be determined by measuring the voltage at the sense lines RX 623 and using that voltage and the known resistances of the reference resistors 621 to derive the resistances of the first and second groups of electrodes 206, 208.

The resistance of the first and second groups of electrodes 206, 208 changes (i.e., increases or decreases) as the first and second groups of electrodes 206, 208 are increasingly strained. Thus, the measured changes in resistance of the first and second groups of electrodes 206, 208 may be combined, weighted, and/or otherwise evaluated to determine the non-binary amount of force that resulted in the straining of the first and second groups of electrodes 206, 208. Hence, the readout circuit 624 may be used (such as by a communicably or otherwise connected processing unit, processor, or other controller) to determine the force of a touch based at least on the deformation of a surface to which the first and second groups of electrodes 206, 208 are coupled in at least first and second directions (i.e., the first and second directions 150, 151 shown in FIGS. 1-4).

In some implementations, the readout circuit 624 may be an application specific integrated circuit that is capable of simultaneously scanning the resistances of the different electrodes of the first and second groups of electrodes 206, 208. Due to the quarter bridge configuration shown, m+n channels may be sufficient for simultaneously scanning the electrodes of a m by n electrode grid.

It is understood that the circuit illustrated in FIG. 6 is provided for the sake of example. In various implementations, other circuits may be used that include the same, similar, and/or different components arranged in a variety of different configurations without departing from the scope of the present disclosure.

Figure 7:
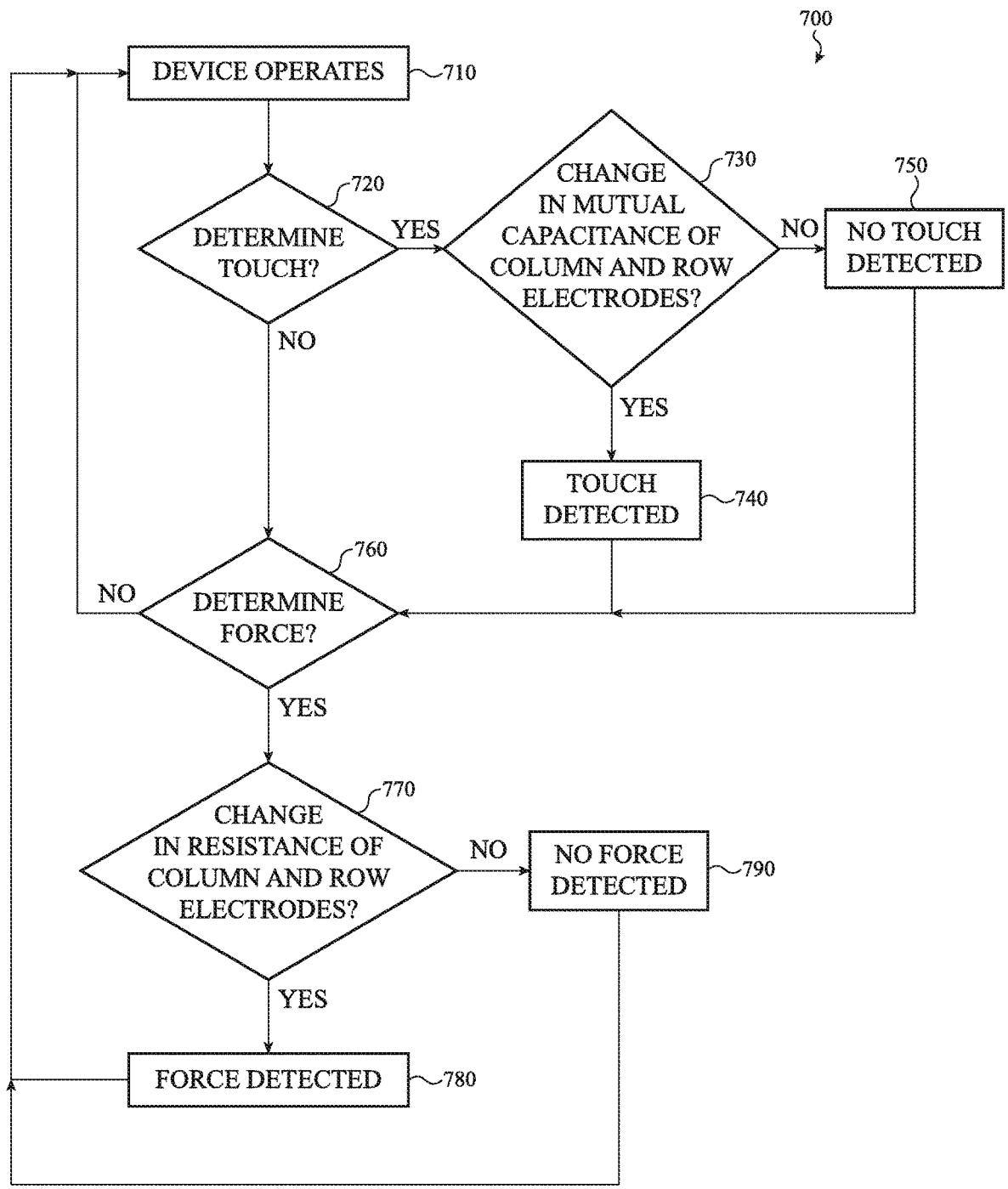
FIG. 7 depicts a flow chart illustrating an example method for detecting touch and determining amounts of force exerted.

FIG. 7 depicts a flow chart illustrating an example method 700 for detecting touch and determining amounts of force exerted. The method 700 may be performed by the electronic device 100 of FIGS. 1-2.

At 710, device operates. The flow proceeds to 720 where the device determines whether or not to determine that a touch has occurred. If so, the flow proceeds to 730. Otherwise, the flow proceeds to 760.

At 730, after the device decides to determine whether or not a touch has occurred, the device scans an electrode grid to determine if there are changes in mutual capacitance between pairs of column and row electrodes that indicate a touch has occurred. If so, the flow proceeds to 740 where the device determines a touch has occurred before the flow proceeds to 760. Otherwise, the flow proceeds to 750 where the device determines a touch has not occurred before the flow proceeds to 760.

At 760, the device determines whether or not to determine that force has been exerted. If so, the flow proceeds to 770. Otherwise, the flow returns to 710 where the device continues to operate.

At 770, after the device decides to determine whether or not force has been exerted, the device scans an electrode grid to determine if there are changes in resistances of column and/or row electrodes. If so, the flow proceeds to 780 where the device determines force has been exerted before returning to 710 where the device continues to operate. Otherwise, the flow proceeds to 790 where the device determines force has been no exerted before returning to 710 where the device continues to operate.

Although the example method 700 is illustrated and described as including particular operations performed in a particular order, it is understood that this is an example. In various implementations, various orders of the same, similar, and/or different operations may be performed without departing from the scope of the present disclosure.

For example, 730-750 is illustrated and described as determining whether or not a touch has occurred. However, it is understood that this is for the purposes of simplicity and clarity. In some implementations, detection of a touch may involve determining the location of the touch without departing from the scope of the present disclosure.

For example, 770-790 is illustrated and described as determining whether or not force has been exerted. However, it is understood that this is for the purposes of simplicity and clarity. In some implementations, detection of exerted force may involve determining the non-binary force amount without departing from the scope of the present disclosure.

Figure 8:
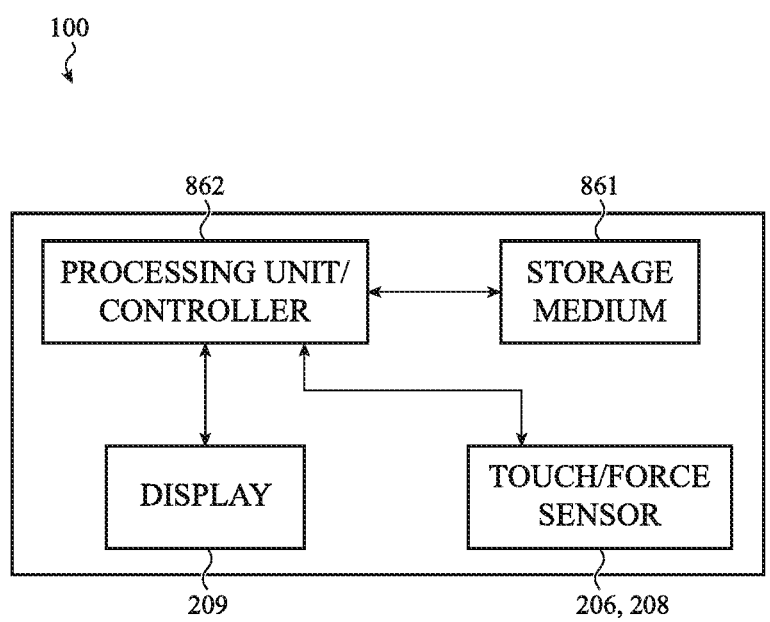
FIG. 8 depicts a block diagram illustrating example functional relationships between example components that may be used in the electronic device of FIG. 2.

FIG. 8 depicts a block diagram illustrating example functional relationships between example components that may be used in the electronic device 100 of FIG. 2. The electronic device 100 may include one or more processing units and/or other processors or controllers 862, one or more non-transitory storage media 861 (which may take the form of, but is not limited to, a magnetic storage medium; optical storage medium; magneto-optical storage medium; read only memory; random access memory; erasable programmable memory; flash memory; and so on), one or more display layers 209 or other displays, and/or one or more touch/force sensors that include an electrode grid or other configuration of first and second groups of electrodes 206, 208.

The controller 862 may execute one or more instructions stored in the non-transitory storage medium 861 to perform various electronic device 100 functions. Such functions may include, but are not limited to, providing output via the display layers 209; detecting touch, determination of touch, determining deformation, determining exertion of force, and/or determining non-binary amounts of force exerted by monitoring mutual capacitances between and/or resistances of the first and second groups of electrodes 206, 208 of the touch/force sensors, and so on.

As described above and illustrated in the accompanying figures, the present disclosure relates to sensing force using touch sensors. A touch sensor may include a grid, mesh, or other configuration that includes rows and columns of electrodes separated by a dielectric. Touch of an object to a surface may alter mutual capacitances between the rows and columns of electrodes. The touch and/or a location of the touch may be detected based on changes in capacitance. The force exerted by the touch may deform the surface as well as the rows and columns of electrodes, altering the resistance of the rows and columns of electrodes. The non-binary amount of the force may therefore be determined based on changes in resistance. In this way, a sensor may determine both touch and force using the same components. This may allow for more compact and less expensive sensor and/or electronic device designs.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A force and touch sensing display assembly, comprising:
   a cover glass;
   a display;
   a set of row electrodes coupled to the cover glass and arranged in a first orientation with respect to the cover glass;
   a set of column electrodes coupled to the display and arranged in a second orientation with respect to the cover glass;
   a dielectric separating the set of row electrodes and the set of column electrodes; and
   a controller electrically connected to the set of row electrodes and the set of column electrodes that is operable to:
      detect a location of a touch of an object on the cover glass using a mutual capacitance between the set of row electrodes and the set of column electrodes; and
      determine a force of the touch using resistances of the set of row electrodes and the set of column electrodes; wherein:
   the controller measures the mutual capacitance between the set of row electrodes and the set of column electrodes in response to determining the force.

2. The force and touch sensing display assembly of claim 1, wherein:
   the resistances of the set of row electrodes change when the cover glass bends in a first direction; and
   the resistances of the set of column electrodes change when the cover glass bends in a second direction perpendicular to the first direction.

3. The force and touch sensing display assembly of claim 1, wherein the dielectric comprises at least one of polyethylene tetra-phthalate or poly-imide.

4. The force and touch sensing display assembly of claim 1, wherein the set of row electrodes and the set of column electrodes are formed of at least one of indium tin oxide or copper nanowires.

5. The force and touch sensing display assembly of claim 1, wherein the controller time multiplexes voltage levels of the set of row electrodes and the set of column electrodes to detect the location of the touch and determine an amount of the force.

6. The force and touch sensing display assembly of claim 1, wherein the controller frequency multiplexes voltage levels of the set of row electrodes and the set of column electrodes to detect the location of the touch and determine an amount of the force.

7. The force and touch sensing display assembly of claim 1, wherein the controller is operable to determine forces of multiple simultaneous touches to the cover glass.

8. A force and touch sensing device, comprising:
   a touch surface;
   an electrode grid formed of a first set of electrodes and a second set of electrodes that are arranged perpendicular to the first set of electrodes and separated from the first set of electrodes by a dielectric; and
   a controller electrically connected to the electrode grid that is operable to:
      detect a touch of an object on the touch surface using a mutual capacitance of the electrode grid;
      determine a force of the touch using resistances of the electrode grid; and
      determine a location of the touch according to where there are both mutual capacitance changes and resistance changes in a subset of multiple electrodes of the electrode grid; wherein:
   the controller measures the mutual capacitance of the electrode grid to detect the touch in response to determining an amount of the force.

9. The force and touch sensing device of claim 8, wherein the controller combines resistances of multiple electrodes of the first set of electrodes and multiple electrodes of the second set of electrodes to determine the force.

10. The force and touch sensing device of claim 8, wherein the controller uses resistances of multiple electrodes of the first set of electrodes and multiple electrodes of the second set of electrodes to determine the force.

11. The force and touch sensing device of claim 8, wherein the controller measures the resistances of the electrode grid to determine an amount of the force when the touch is detected.

12. The force and touch sensing device of claim 8, wherein the controller weights resistances of the first set of electrodes and the second set of electrodes according to the location of the touch.

13. The force and touch sensing device of claim 8, wherein the controller weights a first resistance of the first set of electrodes and the second set of electrodes differently than a second resistance of the first set of electrodes and the second set of electrodes according to the location of the touch.

14. An electronic device, comprising:
   a surface;
   a first group of electrodes coupled to the surface and arranged in a first direction parallel to the surface;
   a second group of electrodes coupled to the surface and arranged in a second direction parallel to the surface;
   a dielectric separating the first and second groups of electrodes; and
   a controller electrically connected to the first and second groups of electrodes that is operable to:
      detect a location of a touch of an object on the surface using a mutual capacitance between the first and second groups of electrodes;
      determine a deformation of the surface in the first direction using resistances of the first group of electrodes;
      determine a deformation of the surface in the second direction using resistances of the second group of electrodes; and
      weight resistances of the first group of electrodes and the second group of electrodes according to the location of the touch to account for how the surface deforms differently in response to different touch locations as part of determining an amount of force.

15. The electronic device of claim 14, wherein at least one of:
   the first group of electrodes are unstrained by deformation of the surface in the second direction; or the second group of electrodes are unstrained by deformation of the surface in the first direction.

16. The electronic device of claim 14, wherein the first and second groups of electrodes are configured in a mesh arrangement.

17. The electronic device of claim 14, wherein the controller is operable to simultaneously scan the resistances of the first and second groups of electrodes.

18. The electronic device of claim 14, wherein the first direction is orthogonal to the second direction.

19. The electronic device of claim 14, wherein the resistances of at least one of the first and second groups of electrodes increase when the surface bends.

20. The electronic device of claim 14, wherein the controller is operable to determine a force of the touch using at least the deformation of the surface in the first and second directions.

* * * * *